United States Patent [19]

Mimura

[11] Patent Number: 5,758,703
[45] Date of Patent: Jun. 2, 1998

[54] APPARATUS FOR MOUNTING AND REMOVING A TIRE FROM A WHEEL

[75] Inventor: Yoshio Mimura, Fukui, Japan

[73] Assignee: Onodani Machine Co., Ltd., Takefu, Japan

[21] Appl. No.: 736,692

[22] Filed: Oct. 25, 1996

[30] Foreign Application Priority Data

Oct. 31, 1995 [JP] Japan ............................ 7-306545
Oct. 31, 1995 [JP] Japan ............................ 7-306546

[51] Int. Cl.$^6$ ............................................ B60C 25/132
[52] U.S. Cl. ........................ 157/1.28; 157/1.2; 157/1.24
[58] Field of Search ........................ 157/1.28, 1.1, 157/1.17, 1.2, 1.24, 1.22, 1.26

[56] References Cited

U.S. PATENT DOCUMENTS

| | | | |
|---|---|---|---|
| 2,470,534 | 5/1949 | Thomas | 157/1.24 |
| 4,420,026 | 12/1983 | Goiseau | 157/1.24 |
| 4,673,016 | 6/1987 | Damman et al. | 157/1.28 X |
| 5,215,138 | 6/1993 | Toriselli et al. | 157/1.17 |
| 5,222,538 | 6/1993 | Tomita et al. | 157/1.17 X |

*Primary Examiner*—D. S. Meislin
*Attorney, Agent, or Firm*—Nikaido, Marmelstein, Murray & Oram LLP

[57] ABSTRACT

A tire mounting and removing apparatus equipped with a first aid unit for making the tire to fit on the wheel, a second aid unit for preventing the tire from slipping off the wheel, and a centering unit. The tire fitting aid unit comprises a movable push plate having rolls rotatably fixed thereto and a piston-and-cylinder drive for driving the push plate thereby to push one side of the tire while rotating, and the tire slip-off preventing aid unit comprises a movable push plate having an arm swingably fixed thereto, and a piston-and-cylinder drive for driving the push plate to permit the swingable arm to push the tire with its end. These aid units facilitate the mounting and removing of a soft tire such as a tubeless tire from the wheel. The centering unit for determining the rising distance of the tire to the wheel at a predetermined level comprises a slidable upright post having a slider mounted thereto and a pneumatic piston-and-cylinder drive for moving the upright post back and forth. The slider has an arm fixed thereto for touching the inner circumference of the wheel or tire bead with its contact end, thereby measuring the side height of the tire. The rising distance of the tire can be determined from the so measured side height of the tire, and from the known values of the radius of the tire and the height of the wheel chuck. The tire lift can be controlled in terms of the so determined rising distance of the tire, thereby permitting the tire to rise automatically up to the level of the wheel.

5 Claims, 7 Drawing Sheets

APPARATUS FOR MOUNTING AND REMOVING A TIRE FROM A WHEEL

BACKGROUND OF THE INVENTION

1. Field of the Invention

The present invention relates to an apparatus for mounting and removing a tire from a wheel.

2. Description of Related Art

Figure 10:
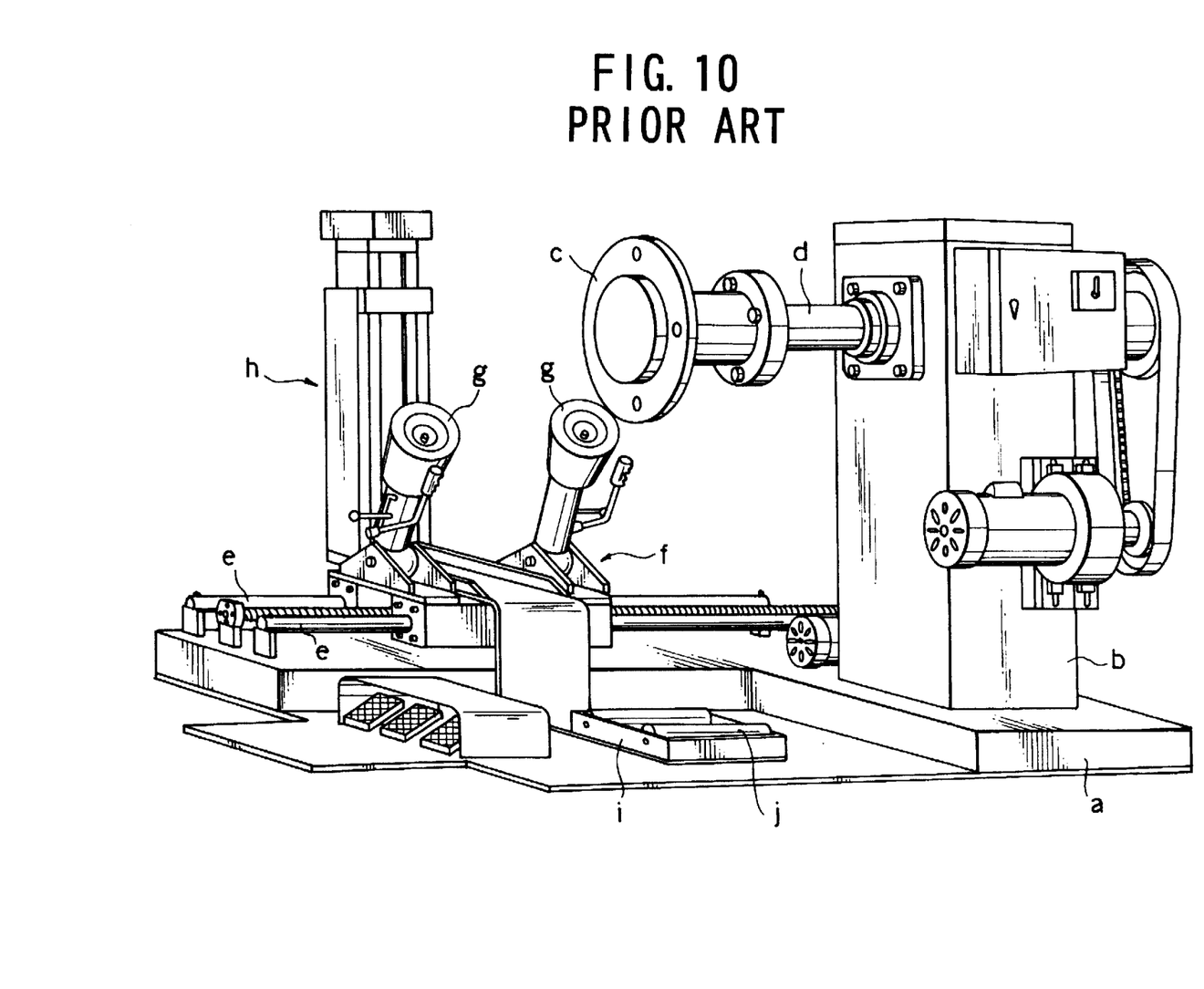
FIG. 10 is a perspective view of a conventional tire mounting apparatus.

A conventional tire mounting apparatus is so constructed that either bead roll is applied to one side of a tire while a wheel is made to turn around its main spindle. One example of such tire mounting apparatus is shown in FIG. 10. As shown in the drawing, it comprises a base "a", an upright stand "b" having a main horizontal spindle "d" fixed its top, and a wheel-mounting disk "c" fixed to the end of the spindle "d", a carrier "f" slidable on guide rails "e", which are laid on the base "a", extending parallel to the main horizontal spindle "d", bead rolls "g" which are pivoted to the carrier "f", and are capable of extending and shrinking with the aid of associated handles, a tire lift "h" whose plate "i" has two supporting rolls "g" arranged parallel to the main horizontal spindle "d", symmetrical with respect to a vertical plane including the central axis of the horizontal spindle "d", and an operating pedal positioned adjacent to the plate "i" of the tire lift "h" on the side of the base "a" which is opposite to the side of the upright stand "b" for controlling the height of the plate "i" of the tire lift "h".

When the tire is put on the wheel, the left bead roll "g" is used, and when the tire is removed from the wheel, the right bead roll "g" is used. Soft tires such as tube-less tires, however, cannot be easily mounted or removed from associated wheels with recourse to the bead roll alone, which bead roll can apply a pushing force only to one side of the tire. The mounting or removing of the tire with an increased force applied thereto is liable to damage the tire. Therefore, there is a demand for tire mounting-and-removing aid in addition to the bead roll.

The wheel is put on the plate "i" of the tire lift "h" to raise it up to the level of the wheel-mounting disk "c", and then, the wheel is bolted to the wheel-mounting disk "c". The wheel can be put on the plate "i" exactly in lateral position by putting it between the two supporting rolls "g". Likewise, a tire can be put on the plate "i" of the tire lift "h" exactly in lateral position. However, the tire lift "h" must be controlled manually or by sight so as to allow the plate "i" to rise up to the level at which the wheel or tire can be attached to the wheel-mounting disk "c" or the wheel bolted thereto. The raising and centering of wheels or tires relative to the wheel-mounting disk "c" by sight is a tedious and time-consuming work. Therefore, there is a demand for automatic centering equipment, thereby permitting automatic rise of the wheel or tire up to the exact level at which the wheel or tire can be attached to the wheel-mounting disk "c".

SUMMARY OF THE INVENTION

One object of the present invention is to provide a tire mounting-and-removing apparatus which can mount on or remove soft tires such as tube-less tires from associated wheels without difficulty.

Another object of the present invention is to provide a tire mounting-and-removing apparatus which permits a tire to rise automatically up to the exact level at which the tire can be mounted on the wheel held by the wheel clutch of the apparatus.

To attain these objects an apparatus for mounting and removing a tire from an associated wheel comprising a base, an upright stand at one end of the base, having a horizontal spindle and a wheel chuck fixed to the end of the horizontal spindle for holding a wheel, a pair of guide rails laid on the base and extending parallel to the horizontal spindle, and a carrier having two bead rolls mounted thereon, the carrier being movable on the guide rails when driven by an associated drive, is improved according to the present invention in that it further comprises another upright stand at the other end of the base, and an aid unit for making the tire to fit round the wheel and an aid unit for preventing the tire from slipping off of the wheel, both units being fixed to the top end of the another upright stand, the aid unit for making the tire to fit round the wheel having a push plate horizontally movable on associated guide rod means, rolls rotatably fixed to the push plate and a piston-and-cylinder drive for driving the push plate thereby to allow the rolls to push the tire, and the aid unit for preventing the tire from slipping off of the wheel having a push plate horizontally slidable on associated guide rod means, an arm swingable over a predetermined angle, the arm having a pusher formed at its top end, drive means for swinging the arm, and a piston-and-cylinder drive for pushing the pusher of the arm against the tire.

It further comprises a centering unit for determining the rising distance of the tire when raised by the tire lift, which centering unit comprises an upright post horizontally slidable on underlying horizontal guide rods and a pneumatic piston-and-cylinder drive for moving the upright post back and forth, the upright post having vertical guide rods fixed thereto, a slider vertically movable along the vertical guide rods and an arm fixed to the slider for touching the inner circumference of the wheel or the tire bead with its contact end.

The tire mounting aid and the tire slip-off preventer according to the present invention together facilitate the mounting and removing of the tire from the wheel. As is known in the conventional tire mounting apparatus, a soft tire such as a tubeless tire will be easily deformed when pushed by its bead rolls, thus preventing the fitting of the tire round the outside edge of the wheel. In contrast, the tire mounting aid applies a controlled pushing force to one side of the tire, thus making the tire to fit partially sequentially round the outside edge of the wheel in cooperation with the bead roll. In addition, in order to prevent the sequential portions of tire from slipping off from the outside edge of the wheel once these sequential portions have fitted therearound, the tire slip-off preventer applies continuously a controlled push to the other side of the tire while allowing the tire to turn.

More specifically, when mounting the tire on the outside edge of the wheel, the tire mounting aid is raised so that its push plate is put in front of the wheel chuck, and then the push plate is driven forward until its rolls abut against one side of the tire. On the other hand, one of the bead rolls is applied to the one side of the tire, and then, the wheel and hence tire starts turning round the spindle. Thus, sequential portions of the tire bead of the one side of the rotating tire fall in the hub recess of the wheel. At the same time, the tire slip-off preventer applies its push plate to the other side of the rotating tire while permitting the arm of the push plate to swing on the other side of the tire synchronously with the turning of the tire. Thus, the end of the arm applies continuously a constant push to the other side of the rotating tire without slipping off. In consequence, sequential portions of the tire bead of the other side of the rotating tire fall in the hub recess of the wheel. Finally the tire fits round the outside edge of the wheel.

When removing the tire from the wheel, the other bead roll is applied to the other side of the tire, and the rolls of the tire mounting aid are applied to the one side of the tire for pushing it inward, thereby causing the tire bead to fall in the hub recess. Thus, the tire can be easily removed from the wheel.

The measuring of the tire-rising distance to the spindle of the tire mounting apparatus can be effected with the aid of the centering unit as follows: a tire-and-wheel is put on the plate of the tire lift; the upright post of the centering unit is made to advance on the guide rods toward the tire-and-wheel until its slider has arrived at such a position that the arm of the slider may touch the inner circumference of the wheel with the contact end of the slider arm when the slider is vertically controlled in height, thus determining the side height of the thick rubber band; and then, the tire-rising distance to the spindle of the mounting apparatus can be determined from the so determined side height of the tire, and from the known values of the level of the wheel chuck and the radius of the wheel.

Other objects and advantages of the present invention may be understood from the following description of preferred embodiments of the present invention, which are shown in accompanying drawings.

DESCRIPTION OF THE PREFERRED EMBODIMENTS

Figure 1:
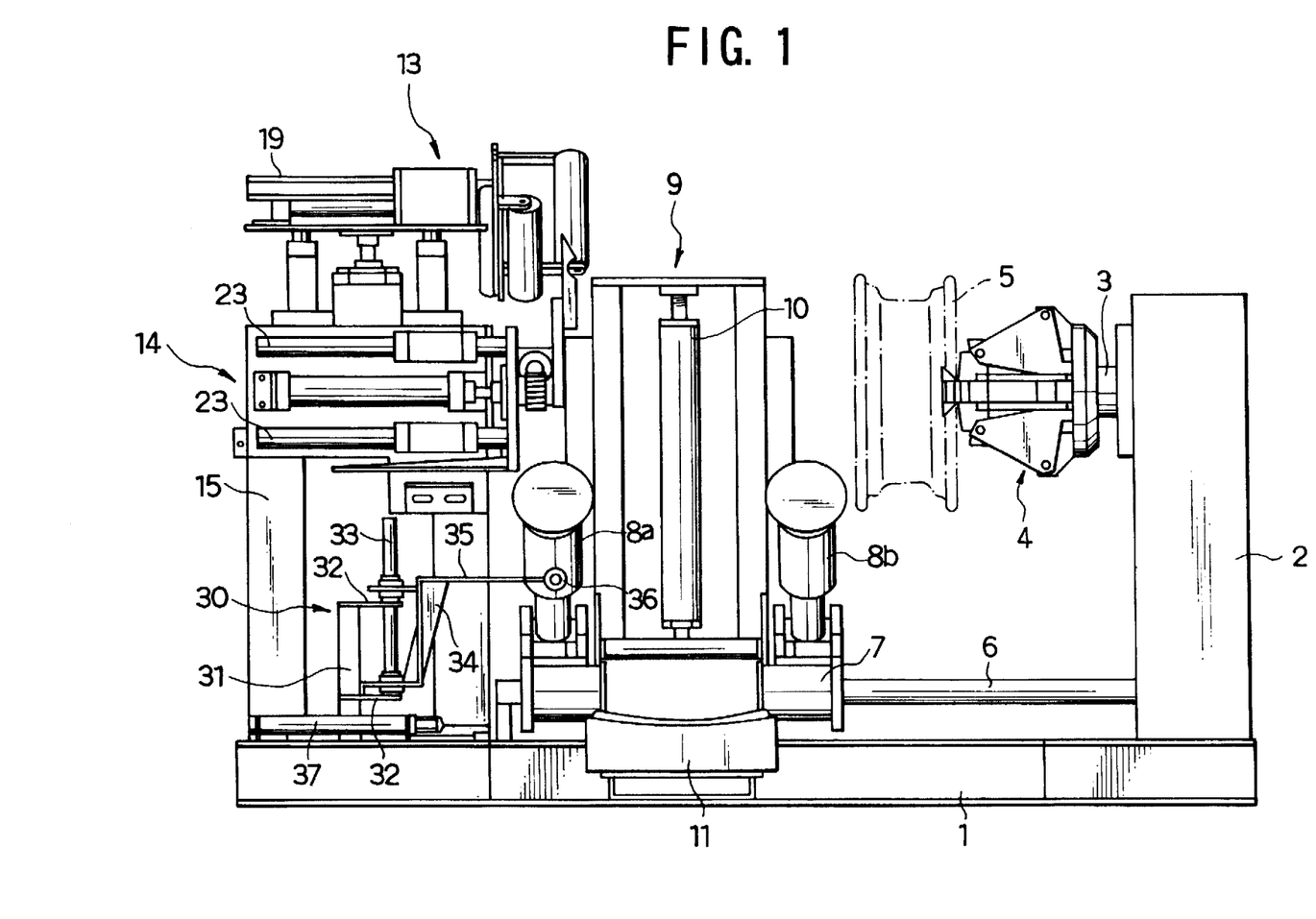
FIG. 1 is a front view of a tire mounting apparatus according to one preferred embodiment of the present invention.
Figure 2:
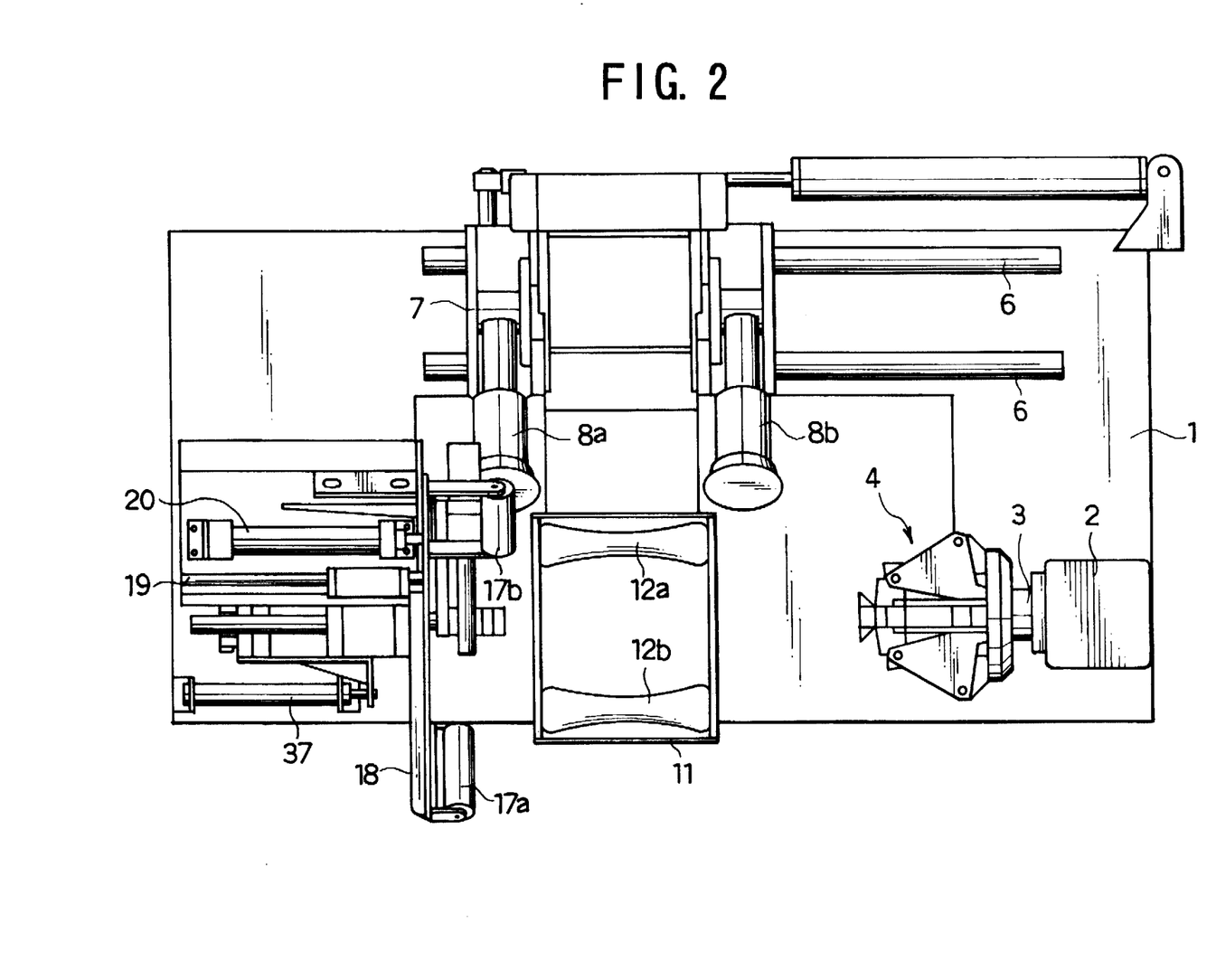
FIG. 2 is a plane view of the tire mounting apparatus.
Figure 3:
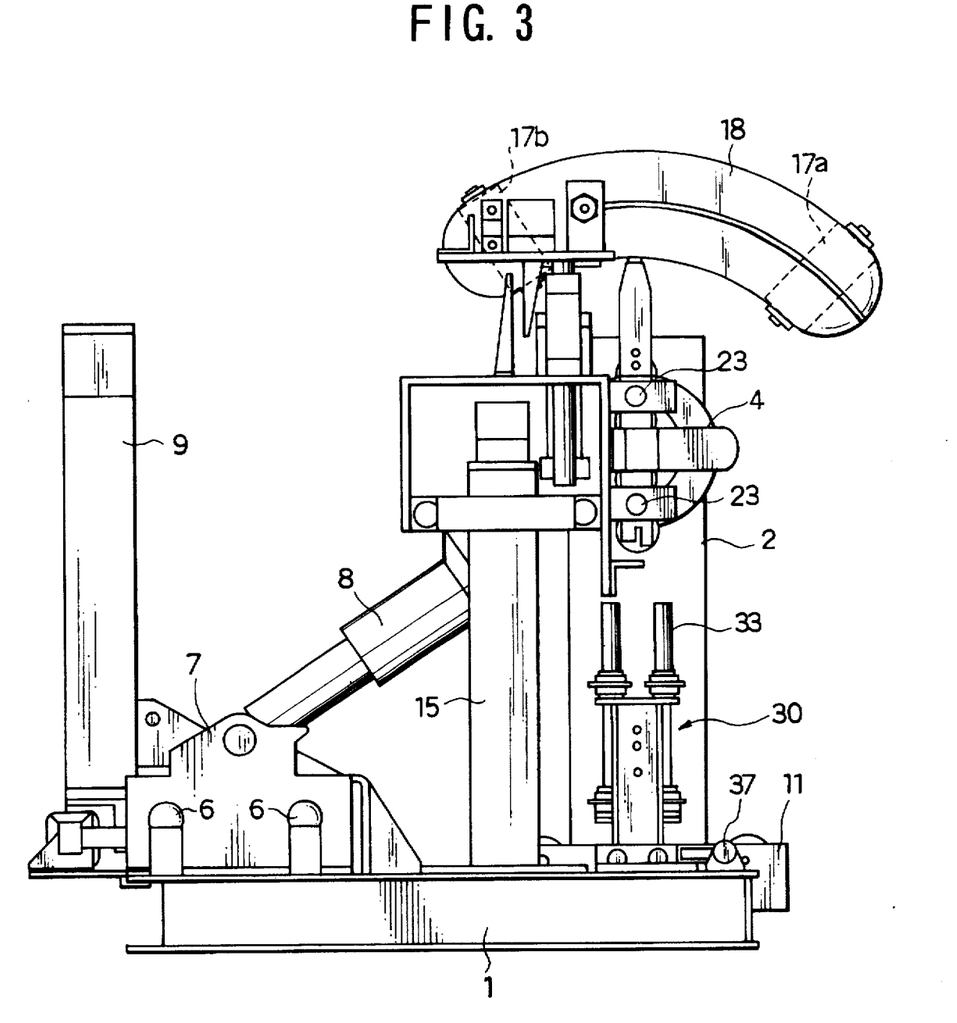
FIG. 3 is an end view of the tire mounting apparatus.

Referring to FIGS. 1, 2 and 3, an apparatus for mounting and removing a tire from an associated wheel according to the present invention comprises an aid unit for making the tire to fit round the wheel and an aid unit for rotating the tire while sequential portions of the tire are fitting round the the wheel in addition to the structure of the conventional tire mounting apparatus. Specifically, it comprises a base 1, an upright stand 2 at one end of the base 2, having a horizontal spindle 3 and a wheel chuck 4 fixed to the end of the horizontal spindle 3 for holding a wheel 5, a pair of guide rails 6 and 6 laid on the base 2, and extending parallel to the horizontal spindle 3, and a carrier 7 having two bead rolls 8a and 8b pivoted thereto. The wheel chuck 4 is composed of link-operated nails to hold a wheel 5. The carrier 7 is movable on the guide rails 6 when driven by an associated drive. Each bead roll 8a or 8b has a stepwise-extendable rod pivoted to the carrier 7, thus permitting the swinging of the bead roll in a vertical plane perpendicular to the guide rails 6.

Also, the carrier 7 has a tire lift 9 fixed thereto, and the tire lift 9 comprises a lift plate 11 and an associated piston-and-cylinder drive 10. The lift plate 11 has two support rods 12a and 12b parallel-arranged thereon for bearing a tire therebetween. The tire can be raised up to the level of the wheel chuck 4 with the aid of the tire lift 9.

As seen from FIGS. 1 to 3, the tire mounting aid 13 and the tire slip-off preventer 14 are fixed to the top of another upright stand 15, which is positioned at the other end of the base 1. These devices facilitate the mounting and removing of the tire from the outside edge of the wheel as described below.

Figure 4A:
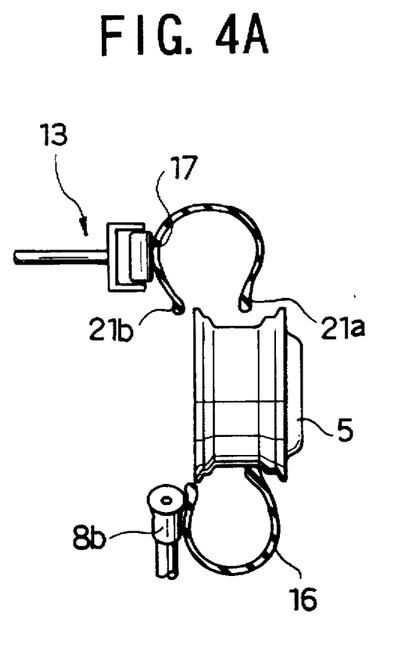
FIGS. 4a and 4b show how a tire is made to fit round the outside edge of a wheel.
Figure 5:
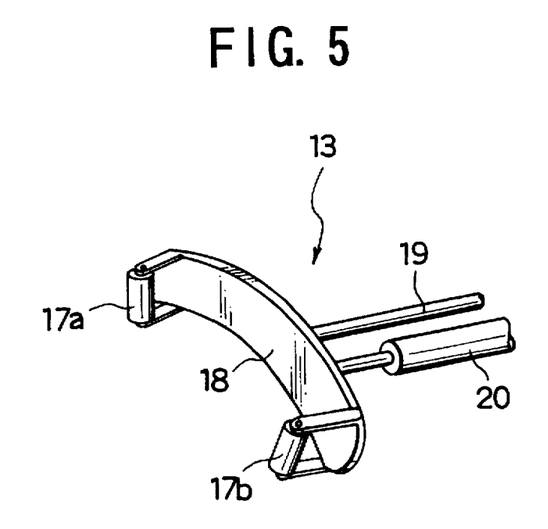
FIG. 5 is a perspective view of the arm end of the tire mounting aid unit.

Referring to FIG. 4a, the manner in which a tire is made to fit round the outside edge of the wheel 5 is described. The tire is put on the lift plate 11 to be raised up to the level of the wheel chuck 4, and then, the tire is applied to the wheel by pushing one side of the tire with one bead roll 8a. While the tire 16 is allowed to turn on the lift plate 11 along with the wheel 5, the tire is pushed against the wheel 5 by the bead roll 8a, thereby making sequential portions of the tire to fit round the outside edge of the wheel 5. Lest these sequential portions of tire should slip-off the outside edge of the wheel 5 on the side which is diametrically opposite to the pushing side of bead roll (upside in the drawing), the tire mounting aid 13 applies its roll 17 to the rotating tire. FIG. 5 shows some details of the tire mounting aid 13. It comprises a push plate 18 horizontally movable on an associated guide rod 19, rolls 17a and 17b rotatably fixed to the push plate 18 and a piston-and-cylinder drive 20 for driving the push plate 18. As shown, the push plate 18 is somewhat curved, and the roll 17b projects somewhat longer than the roll 17a, thereby permitting these rolls 17a and 17b to fit on the tire, which is somewhat inclined while being made to fit round the outside edge of the wheel 5. The push plate 18 can be driven by the piston-and-cylinder drive 20 to apply its rolls 17a and 17b to the tire.

The tire can fit round the outside edge of the wheel automatically on the side 21a of the tire which is opposite to the pushing side, but not on the pushing side 21b. More specifically, as the bead roll 8a and the tire mounting aid 13 apply together pushing forces to the side 21b of the tire, and even if one bead side 21a of the tire fits round the outside edge of the wheel 5, the tire 16 cannot turn along with the turning wheel 5, thus allowing the wheel 5 to turn by itself, and not allowing the tire 16 to follow the turning wheel 5.

Figure 6A:
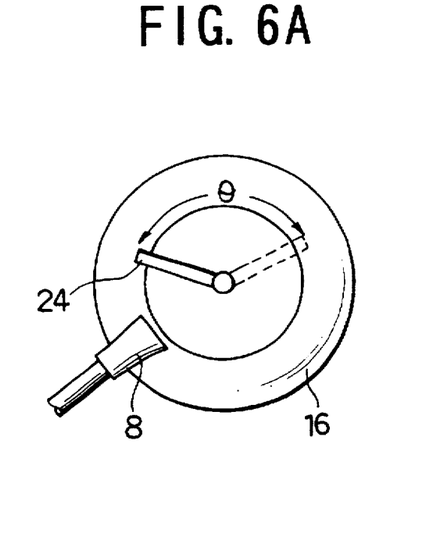
FIGS. 6a and 6b are front and side views of the arm end of the tire rotating aid unit respectively.
Figure 6B:
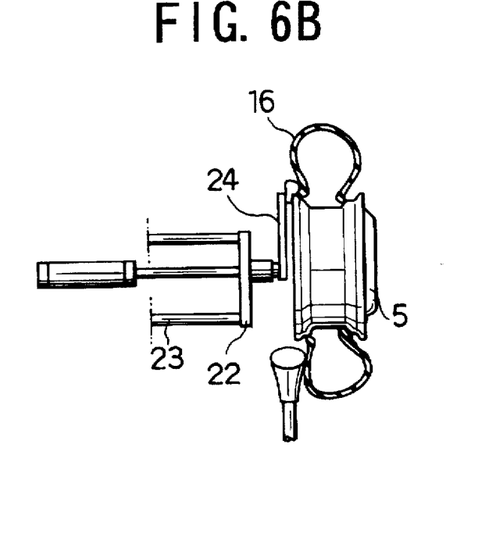

In the conventional tire mounting apparatus an attendant must use his hands to push the tire lest the sequential portions of tire bead 21b should get out of the outside edge of the wheel 5 once these sequential portions have been made to fit therearound by the bead roll 8a. As a substitute therefor the tire slip-off preventer 14 as shown in FIG. 6 is used. It comprises a push plate 22 horizontally slidable on associated guide rods 23, an arm 24 swingable over a predetermined angle θ, drive means for swinging the arm 24 (see FIG. 7), and a piston-and-cylinder drive for driving the push plate 22 toward the tire to push the arm 24 against the tire 16. The swingable arm 24 has a pusher 25 formed at its top end, and is driven so that the arm 24 swings between starting position "a" and terminal position "b" with the pusher 25 applied on the tire bead, thereby preventing the sequential portions of tire 16 from slipping off of the outside edge of the wheel 5 once these sequential portions have been made to fit round the outside edge of the wheel 5 by the bead roll 8a.

Figure 7A:
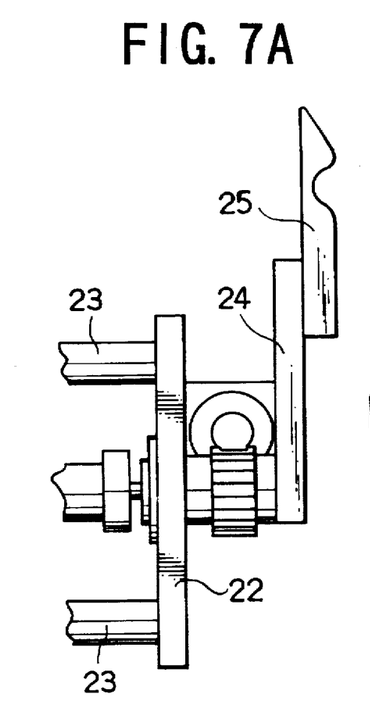
FIGS. 7a and 7b show some details of selected parts of the tire rotating aid unit.
Figure 7B:
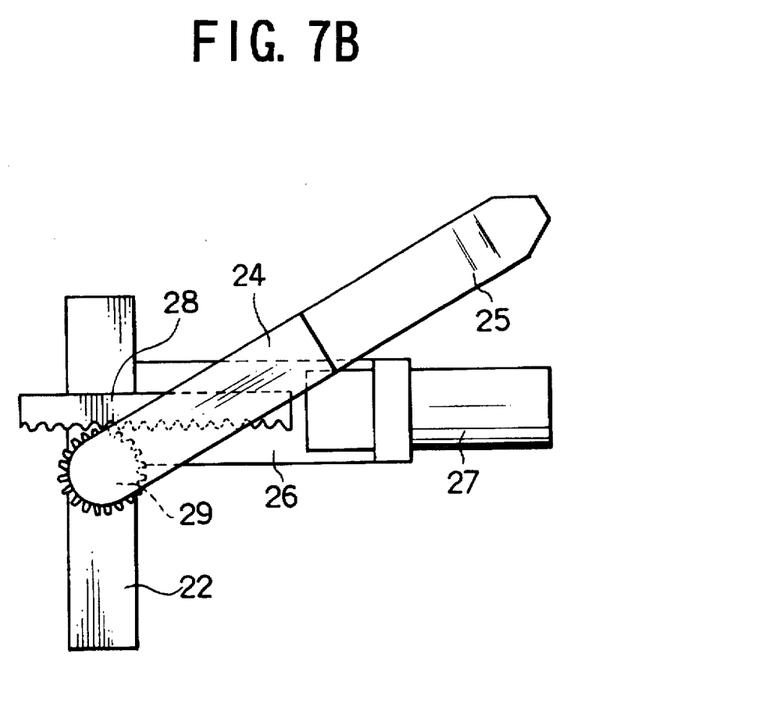

As seen from FIG. 7, the swingable arm 24 has a pinion 29 fixed to its pivot end, and the pinion 29 is engaged with a racked piston-and-cylinder drive 27. The swingable arm 24 can swing to follow the turning wheel when the swingable arm 24 is driven from starting position "a" to terminal position "b" by the racked piston-and-cylinder drive 27 while allowing the pusher 25 to push the tire 16. After reaching the terminal position "b" the swingable arm 24 is made to return to the starting position "a" by reversing the racked piston-and-cylinder drive 27. In this particular embodiment the tire mounting apparatus is described as being equipped with both of the tire mounting aid and the tire slip-off preventer. However, a tire mounting apparatus may be equipped with one of these devices.

Figure 4B:
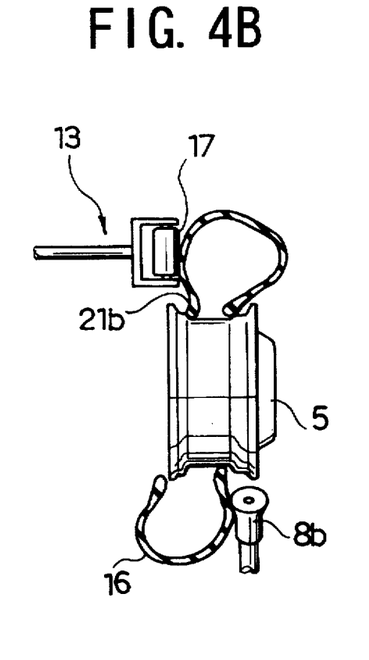

Referring to FIG. 4b, the manner in which the tire is removed from the wheel 5 is described. The other bead roll 8b is used to push the other side of the tire, and at the same time, the tire mounting aid 13 is used to push the one side of the tire, thereby making the tire bead 21b to fall in the hub recess of the wheel 5. Once the tire bead 21b has got off from the outside edge of the wheel, the other tire bead 21a can get off from the outside edge of the wheel without difficulty. Thus, the tire can be removed from the wheel 5.

Figure 8A:
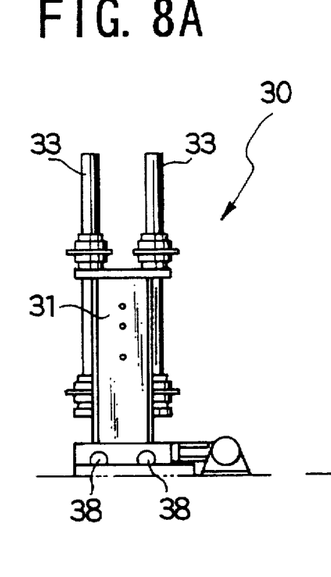
FIGS. 8a and 8b are front and side views of the centering unit respectively.
Figure 8B:
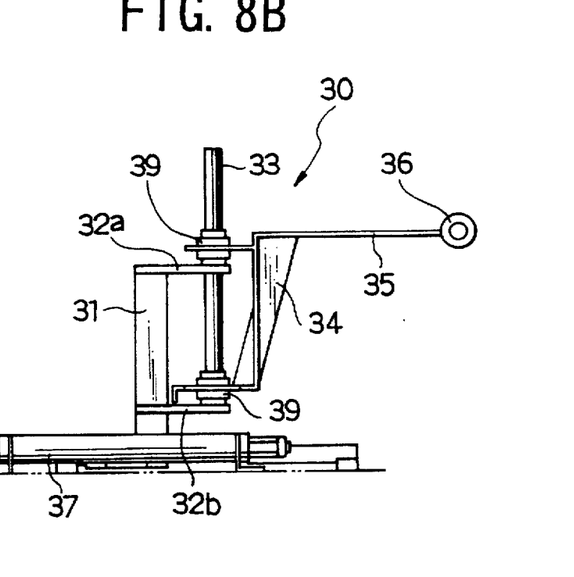
Figure 9:
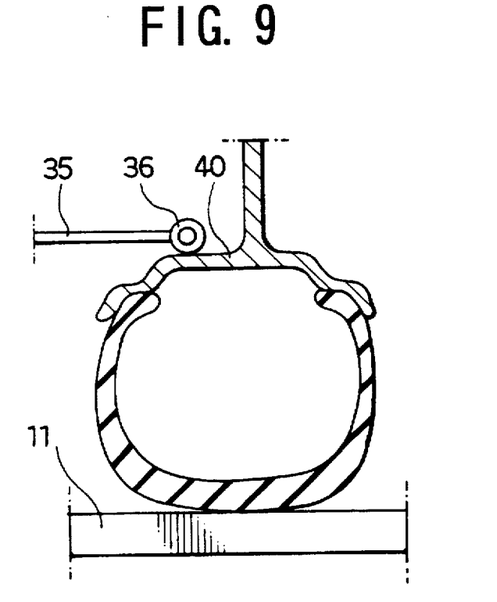
FIG. 9 show how the side height of the tire can be measured with the aid of the centering unit.

The tire mounting apparatus is equipped with a centering unit 30 for determining the height of the tire side, thereby permitting the determination of the rising distance of the lift plate up to the level at which the tire can be mounted on the wheel. It comprises an upright post 31 horizontally slidable on underlying horizontal guide rods 38 and a pneumatic piston-and-cylinder drive 37 for moving the upright post 31 back and forth. The upright post 31 has vertical guide rods 33 fixed to its supports 32a and 32b, a slider 34 vertically movable along the vertical guide rods 33 and a horizontal arm 35 fixed to the slider 34 for touching the inner circumference 40 of the tire bead or wheel 5 with its contact end 36. The slider 34 is slidably fixed to the vertical guide rods 33 by means of bearings 39, and the contact end 36 of the horizontal arm 35 takes a spherical or circular shape to facilitate the touching of the contact end 36 on the inner circumference of the tire bead, and at the same time, the rising of the slider by allowing the contact end 36 to climb the tire side to measure the height "H" of the thick rubber band on the lift plate, as seen from FIG. 9. The rising distance of the lift plate 11 high enough for the tire to face the wheel can be determined from the so measured height "H" of the tire side, and the known values of the radius of the tire and the height of the wheel chuck. Once the rising distance of the lift plate has been determined, the lift plate 11 bearing the tire thereon can be raised automatically upto the exact level at which the tire can face the wheel for mounting.

Each of the respective piston-and-cylinder drive devices for moving the carriage 7, the tire mounting aid 13, the tire slip-off preventer 14, and the centering device have piston rods long enough to operate the respective devices with the tire on the chuck.

What is claimed is:

1. An apparatus for mounting and removing a tire from an associated wheel comprising a base, an upright stand at one end of the base, having a horizontal spindle and a wheel chuck fixed to the end of the horizontal spindle for holding a wheel, a pair of guide rails laid on the base, and extending parallel to the horizontal spindle, a carrier having two bead rolls mounted thereon, the carrier being movable on the guide rails when driven by an associated drive, another upright stand at the other end of the base, and an aid unit for preventing the tire from slipping off of the wheel, fixed to the top end of the another upright stand, the aid unit having a push plate horizontally slidable on associated guide rod means, an arm swingable over a predetermined angle, the arm having a pusher formed at a top end, drive means for swinging the arm, and a piston-and-cylinder drive for driving the push plate to permit the arm to push the tire with said pusher.

2. An apparatus for mounting and removing a tire from an associated wheel according to claim 1 wherein said drive means for swinging the arm comprises a pinion fixed to a pivot of the arm, an associated rack engaging the pinion, and a piston-and-cylinder drive operatively connected to the rack for moving the rack back and forth.

3. An apparatus for mounting and removing a tire from an associated wheel comprising a base, an upright stand at one end of the base, having a horizontal spindle and a wheel chuck fixed to the end of the horizontal spindle for holding a wheel, a pair of guide rails extending parallel to the horizontal spindle on the base, a carrier having two bead rolls mounted thereon, the carrier being movable on the guide rails when driven by an associated drive, another upright stand at the other end of the base, a first aid unit for making the tire to fit on the wheel and a second aid unit for preventing the tire from slipping off of the wheel, both units being fixed to the top end of the another upright stand, the first aid unit for making the tire to fit on the wheel having a first push plate horizontally movable on associated guide rod means, rolls rotatably fixed to the first push plate and a piston-and-cylinder for driving the first push plate thereby to push the tire, and the second aid unit for preventing the tire from slipping off of the wheel having a second push plate horizontally slidable on associated guide rod means, an arm swingable over a predetermined angle, the arm having a pusher formed at a top end, drive means for swinging the arm, and a piston-and-cylinder for driving the second push plate to permit the arm to push the tire with said pusher.

4. An apparatus for mounting and removing a tire from an associated wheel comprising a base, an upright stand at one end of the base, having a horizontal spindle and a wheel chuck fixed to the end of the horizontal spindle for holding a wheel, a pair of guide rails laid on the base, and extending parallel to the horizontal spindle, a carrier having two bead rolls mounted thereon, the carrier being movable on the guide rails when driven by an associated drive, a tire lift for raising the tire up to the level of the wheel chuck, the tire lift having two supporting rolls positioned symmetrically relative to a vertical plane including the center axis of the wheel chuck, another upright stand at the other end of the base, a first aid unit for making the tire to fit on the wheel, a second aid unit for preventing the tire from slipping off, both units being fixed to the top end of the another upright stand, the first aid unit for making the tire to fit on the wheel having a first push plate horizontally movable on associated guide rod means, rolls rotatably fixed to the first push plate and a piston-and-cylinder drive for driving the first push plate thereby to push the tire, and the second aid unit for preventing the tire from slipping off having a second push plate horizontally slidable on associated guide rod means, a pusher arm swingable over a predetermined angle, the arm having a pusher formed at a top end, drive means for swinging the pusher arm, and a piston-and-cylinder drive for driving the second push plate to permit the pusher arm to push the tire with said pusher, and a centering unit for determining the rising distance of the tire to the wheel when raised by the tire lift, having a slider horizontally and vertically movable above the base and a contact arm fixed to the slider for touching the inner circumference of the wheel or tire bead with a contact end.

5. An apparatus for mounting and removing a tire from an associated wheel according to claim 4 wherein said centering unit comprises an upright post horizontally slidable on underlying horizontal guide rods and a pneumatic piston-and-cylinder drive for moving the upright post back and forth, the upright post having vertical guide rods fixed thereto, said slider being vertically movable along the vertical guide rods.

* * * * *